United States Patent [19]
Ito et al.

[11] Patent Number: 5,848,372
[45] Date of Patent: Dec. 8, 1998

[54] APPARATUS FOR DETECTING TROUBLE STATES IN ENGINE

[75] Inventors: Yoshiharu Ito; Keishi Asano, both of Nagoya, Japan

[73] Assignee: Toho Gas Co., Ltd., Japan

[21] Appl. No.: 555,405

[22] Filed: Nov. 9, 1995

[51] Int. Cl.[6] .............................. G06G 7/70; G01L 3/26
[52] U.S. Cl. ..................... 701/111; 701/101; 701/102; 701/110; 73/117.3; 73/117.2; 73/115
[58] Field of Search .................. 364/431.04, 431.11, 364/431.061, 551.01, 431.01, 423.098; 123/670, 481, 676, 571, 316, 90.1, 569, 436, 90.15, 90.17; 73/117.3, 115, 118.1, 116, 117.2, 119 R, 112; 60/293, 278; 701/100, 101, 102, 103, 107, 110, 111

[56] References Cited

U.S. PATENT DOCUMENTS

| | | | |
|---|---|---|---|
| 4,189,940 | 2/1980 | Hulls et al. | 73/117.3 |
| 4,277,830 | 7/1981 | Reid et al. | 364/431.01 |
| 4,291,383 | 9/1981 | Tedeschi et al. | 364/431.04 |
| 4,424,709 | 1/1984 | Meier et al. | 73/117.3 |
| 4,453,379 | 6/1984 | Kawamura et al. | 60/278 |
| 4,633,707 | 1/1987 | Haddox | 73/117.3 |
| 5,018,069 | 5/1991 | Pettigrew | 364/431.01 |
| 5,109,695 | 5/1992 | James et al. | 73/117.3 |
| 5,138,163 | 8/1992 | Butler et al. | 73/116 |
| 5,193,513 | 3/1993 | Marko et al. | 364/431.061 |
| 5,287,283 | 2/1994 | Musa | 364/431.11 |
| 5,492,006 | 2/1996 | Beckett | 73/117.2 |

FOREIGN PATENT DOCUMENTS 06317215A 11/1994 Japan.
07233754 9/1995 Japan.

OTHER PUBLICATIONS

Synlett, No. 10, pp. 783–784, Oct. 1993, S. Klinge, et al., "An Improved Procedure for the Preparation of All–Trans–Geranylgeraniol [1]".
Journal of Organic Chemistry, vol. 43, No. 26, pp. 4915–4922, 1978, Robert M. Coates, et al., "Synthesis and Carbon–13 Nuclear Magnetic Resonance Spectra of All–Trans–Geranygeraniol and its Nor Analogues".

Primary Examiner—Jacques H. Louis-Jacques
Attorney, Agent, or Firm—Rossi & Associates

[57] ABSTRACT

An apparatus detects trouble states in a gas engine in which the exhaust gas pressure after combustion in each cylinder is measured by a pressure sensor installed on a collecting exhaust pipe. An average value of the exhaust pressure, a standard deviation and a fluctuation values of the average value in each cylinder is calculated. Based on the calculated data, it is specified whether the trouble occurring in the gas engine corresponds to a misfire, a leakage in the inlet value or a leakage in the outlet valve, as well as which cylinder is the cause of the problem.

18 Claims, 10 Drawing Sheets

| S 1 | SAMPLING DATA FOR ONE CYCLE |
|---|---|
| S 2 | CALCULATE $P_{AV}(i)(i=1 \sim 6)$ |
| S 3 | CALCULATE STANDARD DEVIATION D OF $P_{AV}V(i)(i=1 \sim 6)$ |
| S 4 | CALCULATE $S(i) = P_{AV}(i)(i-1) - P_{AV}(i)$ |
| S 5 | $D > D_S \times N1$ ? |
| S 6 | JUDGE THAT THERE IS NO TROUBLE IN GAS ENGINE |
| S 7 | JUDGE THAT THERE IS TROUBLE IN GAS ENGINE |
| S 8 | $D > D_S \times N2$ ? |
| S 9 | JUDGE THAT THERE OCCURS MISFIRE IN GAS ENGINE |
| S 10 | JUDGE THAT CYLINDER WITH MAXIMUM FLUCTUATION VALUE $S(i)$ IS CYLINDER WITH MISFIRE |
| S 11 | MAXIMUM FLUCTUATION $S(i) < D_S \times N3$ ? |
| S 12 | JUDGE THAT INLET VALVE LEAKAGE OCCURS IN GAS ENGINE |
| S 13 | JUDGE THAT CYLINDER IGNITED NEXT TO CYLINDER WITH MAXIMUM AVERAGE VALUE $P_{AV}(i)$ IS CYLINDER WITH INLET VALVE LEAKAGE |
| S 14 | MAXIMUM AND MINIMUM FLACTUATION VALUES $S(i)$ ARE NEIGHBORED EACH OTHER? |
| S 15 | JUDGE THAT EXHAUST VALVE LEAKAGE OCCURS IN GAS ENGINE |
| S 16 | JUDGE THAT CYLINDER WITH MAXIMUM FLUCTUATION VALUE $S(i)$ IS CYLINDER WITH EXHAUST VALVE LEAKAGE |
| S 17 | JUDGE THAT OTHER TROUBLE OCCRS |
| S 18 | OUTPUTS JUDGING RESULT |

APPARATUS FOR DETECTING TROUBLE STATES IN ENGINE

BACKGROUND OF THE INVENTION

1. Field of the Invention

The present invention relates to an apparatus for detecting trouble states in an engine which is utilized for gas cogeneration system through which power generation or heat supply can be conducted by using gas fuel such as natural gas. In particular, the present invention relates to an apparatus for detecting trouble states in an engine by analyzing deviation obtained on the basis of measurement of exhaust pressure waveform, while classifying the three kinds of troubles into misfire, leakage state of combustion gas from an inlet valve and leakage state of combustion gas from an exhaust valve.

2. Description of Related Art

Recently, in order to save energy, it is widely used a gas cogeneration system utilizing gas fuel such as city gas in various places such as factories, department stores, hotels and hospitals, as a private power generation system. It is the reason that energy can be efficiently used if heat energy produced when a gas engine is run for purpose to drive a dynamo is collected and utilized.

In general, the gas engine used for the gas cogeneration system is 4-cycle engine of jump spark ignition type sparked by ignition plugs, similar to a gasoline engine installed in a car. Thus, also in the gas engine, there will occur a case that the ignition plugs cannot satisfactorily spark due to retrogradation thereof according to running state of the gas engine, thereby it is conceivable that misfire trouble, which is occurring due to fail to ignite fuel gas provided for the gas engine, is generated. The above retrogradation of the spark plugs is derived due to abrasion of electrodes based on that the spark plugs are used for a long time or due to carbon deposited therein, the carbon being produced by incomplete combustion of the fuel gas.

In case of the 4-cycle engine, since the inlet valve and the exhaust valve are arranged with the combustion chamber, it is conceivable that troubles due to abnormality of the inlet or exhaust valve will occur. That is to say, if sealing ability of the inlet or exhaust valve goes down, the fuel gas in the combustion chamber is leaked into the inlet or exhaust valve. Here, such deterioration of sealing ability is generated by abnormal abrasion of the valves occurrable by failure to select the material thereof or to manufacture thereof, or by ash of lubricating oil bound in the area where the valves are contacted.

In case that the above troubles are generated, the heat energy produced by combustion of the fuel gas cannot be efficiently converted to the mechanical energy, and the energy efficiency extremely goes down based on that the abnormality of exhaust pressure affects the other combustion cylinder. Further, in addition to the above, since high temperature and high pressure gas invades into the inlet line or incomplete combustion gas leaks into the exhaust line, there are problems that so-called after-fire or back-fire is generated and catalyser to purify the exhaust gas is rapidly degraded. As a result, it gives rise to problems that parts of the engine are mechanically damaged and nitrogen oxides deriving air pollution is exhausted.

Particularly, in case of the gas engine utilized in the cogeneration system, the gas engine is generally run for 24 hours during a day without operators, it is possible that large accident may occur due to troubles such as the abrasion of the electrodes in the ignition plugs, the abrasion of the valves or binding of the ash in the area where the valves are contacted. Here, some of the above troubles may be also generated in a diesel engine or 2-cycle engine.

In order to dissolve the above problems, it is conceivable that the ignition plugs are periodically exchanged or the valves are periodically cleaned before the abrasion of the electrodes or the valves occurs. However, periodic exchange of the ignition plugs leads to waste of the plugs because the plugs being not abraded are thrown away, and exchange of the plugs is very troublesome since frequency necessary to exchange the plugs is very high. Further, other than the abrasion of the plugs, it may occur the misfire due to trouble generated in fuel line of the engine. In this case, the misfire cannot be avoided if the plugs are exchanged.

And both attachment and detachment of the inlet valve, the exhaust valve are more troublesome than exchange of the ignition plugs since the cylinder head should be necessarily removed in the plug case.

Taking into consideration the above situation, there are following various methods so as to detect in early stage troubles such as misfire, etc. occurring in the gas engine, thereby to avoid running of the engine in the troubling condition.

(1) In the first method, the trouble in the engine is detected based on the change of rotation number in the engine.

(2) In the second method, the trouble in the engine is detected by measuring the temperature of the exhaust gas in each of the cylinders.

(3) In the third method, the trouble in the engine is detected based on the change of the current generated in the ignition plugs or the change of the voltage applied to the ignition plugs.

(4) In the fourth method, the trouble in the engine is detected based on the combustion pressure in the cylinder.

However, in the above conventional methods, there are problems mentioned below.

That is to say;

(1) In the first method, for example, in the misfire case, the misfire cannot be certainly detected since the change of rotation number is scarcely generated even if the misfire having a long interval sporadically occurs. On the other hand, in the real gas cogeneration system, the misfire sporadically occurs in early stage and thereafter, the misfire with a short interval continuously occurs, according to that the abrasion of the ignition plugs progresses. Therefore, the abrasion of the ignition plugs can be scarcely detected in early stage.

Further, if the troubles of the leakage from both the inlet valve and the exhaust valve are generated, the change of the rotation number cannot become detectable unless the troubling condition is considerably progressed, since the change of the rotation number is fluctuated every cylinder. And the gas engine is run with the dynamo having a large inertia moment in the gas cogeneration system, therefore the change of the rotation number thereof can be scarcely detected.

(2) In the second method, though it can be specified the cylinder in which some kinds of trouble occur, there is a problem that the misfire trouble cannot be detected unless it frequently occurs, since the temperature of the exhaust gas has only a very poor responsibility. Further, in this case, it is necessary to install a temperature sensor in each of the cylinders, thus such installation is very troublesome.

(3) In the third method, though it can recognize whether spark from the ignition plugs occurs or not, there is a problem that the misfire due to ignition failure of the plugs cannot be detected because it is unclear whether the plug is actually ignited or not. Against the leakage trouble from the inlet valve and the exhaust valve, the third method cannot, of course, dissolve the leakage trouble.

(4) In the fourth method, pressure sensors are necessitated for each of the cylinders and further it is necessary to form holes for attaching the pressure sensors, therefore the fourth method leads to high-cost and is not suitable for practical use.

And in all methods mentioned above, it cannot be clearly judged the kind of trouble, thus it cannot be correctly determined what maintenance work is necessary to maintain the gas engine based on the measurement results.

SUMMARY OF THE INVENTION

Accordingly, it is an object of the present invention to overcome the above mentioned problems and to provide an apparatus for detecting trouble states in an engine utilized in a gas cogeneration system, in the apparatus, not only troubles in fuel line of the engine can be certainly detected in early stage, thereby it can be possibly avoided that the engine is run under trouble state, but also it can be specified kind of trouble and cylinder in which such trouble occurs, thereby suitable maintenance work of the engine can be correctly determined and time for changing individual parts of the engine such as the ignition plugs and for cleaning the engine can be determined.

To accomplish the object, the present invention provides an apparatus for detecting trouble states in an engine including a plurality of cylinders, the apparatus comprising:

pressure sensing means for measuring exhaust pressure exhausted from the engine;

sampling means for sampling the exhaust pressure values measured by the pressure sensing means during a predetermined time interval;

first calculation means for calculating a representative value of the exhaust pressure every the cylinder based on the exhaust pressure values sampled by the sampling means;

second calculation means for calculating deviation of the representative values calculated by the first calculation means; and judgement means for judging whether the trouble state occurs in the engine based on the deviation calculated by the second calculation means.

According to the apparatus of the present invention, at first the pressure sensing means measures the exhaust pressure exhausted from the plural cylinders of the engine and the sampling means samples the exhaust pressure values during a predetermined time interval. Further, the first calculation means calculates the representative value of the exhaust pressure every the cylinder based on the exhaust pressure values sampled by the sampling means, thereafter the second calculation means calculates the deviation of the representative values calculated by the first calculation means. Finally, the judgement means judges whether the trouble state occurs in the engine based on the deviation calculated by the second calculation means.

Thereby, using the apparatus of the present invention, not only troubles in fuel line of the engine can be certainly detected in early stage, thereby it can be possibly avoided that the engine is run under the trouble state, but also it can be specified kind of trouble and cylinder in which such trouble occurs, thereby suitable maintenance work of the engine can be correctly determined and time for changing individual parts of the engine such as the ignition plugs and for cleaning the engine can be determined.

Therefore, not only it can be shortened running time of the engine under inefficient state, but also it can be avoided so-called after-fire, back-fire and mechanical damage of the gas engine, and further life of the catalyser for purifying the exhaust gas can be lengthened. As a result, it can be totally improved efficiency of the gas cogeneration.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The invention will be described with reference to the following drawings, wherein.

DETAILED DESCRIPTION OF THE PREFERRED EMBODIMENTS

Figure 4:
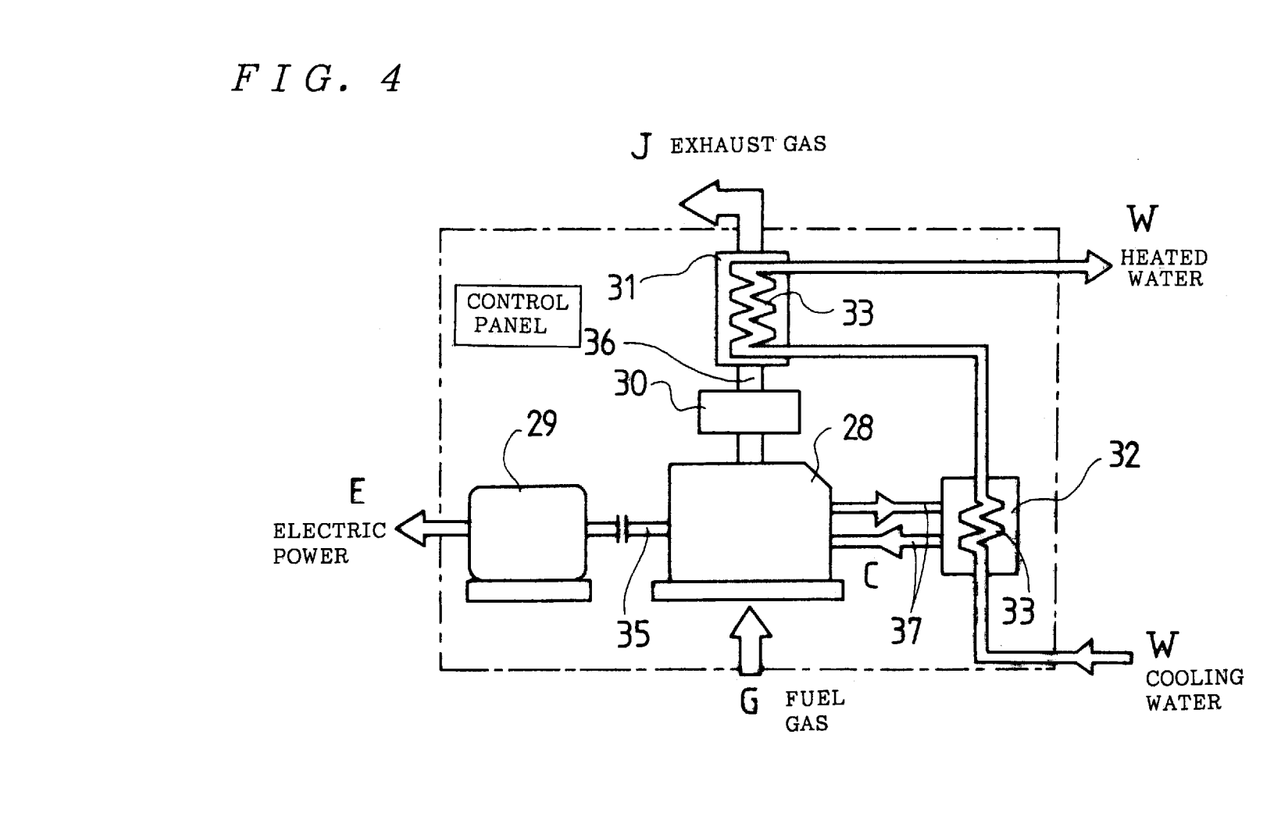
FIG. 4 is a schematic whole view of the gas cogeneration system.

A detailed description of the preferred embodiment embodying the apparatus for detecting trouble states in the gas engine utilized in the gas cogeneration system will now be given referring to the accompanying drawings. First, the gas cogeneration system will be described according to FIG. 4. In FIG. 4, the gas cogeneration system comprises a gas engine 28 operating as a driving source, a dynamo 29 which converts mechanical energy produced by the gas engine 28 into electric energy, a heat exchanger 31 for exhaust gas and a jacket heat exchanger 32, both collecting the heat emitted from the gas engine 28 as useful heat energy.

Here, the gas engine 28 is an internal combustion engine of jump spark ignition type, which adopts 4-cycle six cylinders and uses gas fuel. As the gas fuel, city gas G mainly including natural gas is provided thereto. The dynamo 29 is connected to a output rotation shaft 35 and generates alternate electric power with commercial frequency (here, the frequency is 60 Hz).

In the heat exchanger 31, a water guide pipe 33 through which cooling water W is circulated is contacted with a collecting exhaust pipe 36 through which the exhaust gas with high temperature produced from the gas engine 28 in which fuel gas is combusted, is guided. Thereby, heat energy of the exhaust gas is collected through the cooling water W. In the jacket heat exchanger 32, cooling water C is circulated in the gas engine 28 through a cooling water pipe 37, thereby exhaust heat emitted from the gas engine 28 is collected by conducting heat exchange between the water C and the water W. That is, the water W absorbs the heat energy of the gas engine 28 through the water C at the jacket heat exchanger 32 and the exhaust gas J at the heat exchanger 31.

Here, an exhaust gas converter 30 is arranged between the gas engine 28 and the heat exchanger 31. In the exhaust gas converter 30, harmful nitrogen oxides and carbon monooxide included in the exhaust gas J are reduced and oxidated through platinum catalyser formed on ceramic plate in the exhaust gas converter 30, thereby nitrogen oxides are reduced into nitrogen and carbon monooxide is oxidated into carbon dioxide. Thereafter, nitrogen gas and carbon dioxide gas are discharged in the atmosphere.

Figure 3:
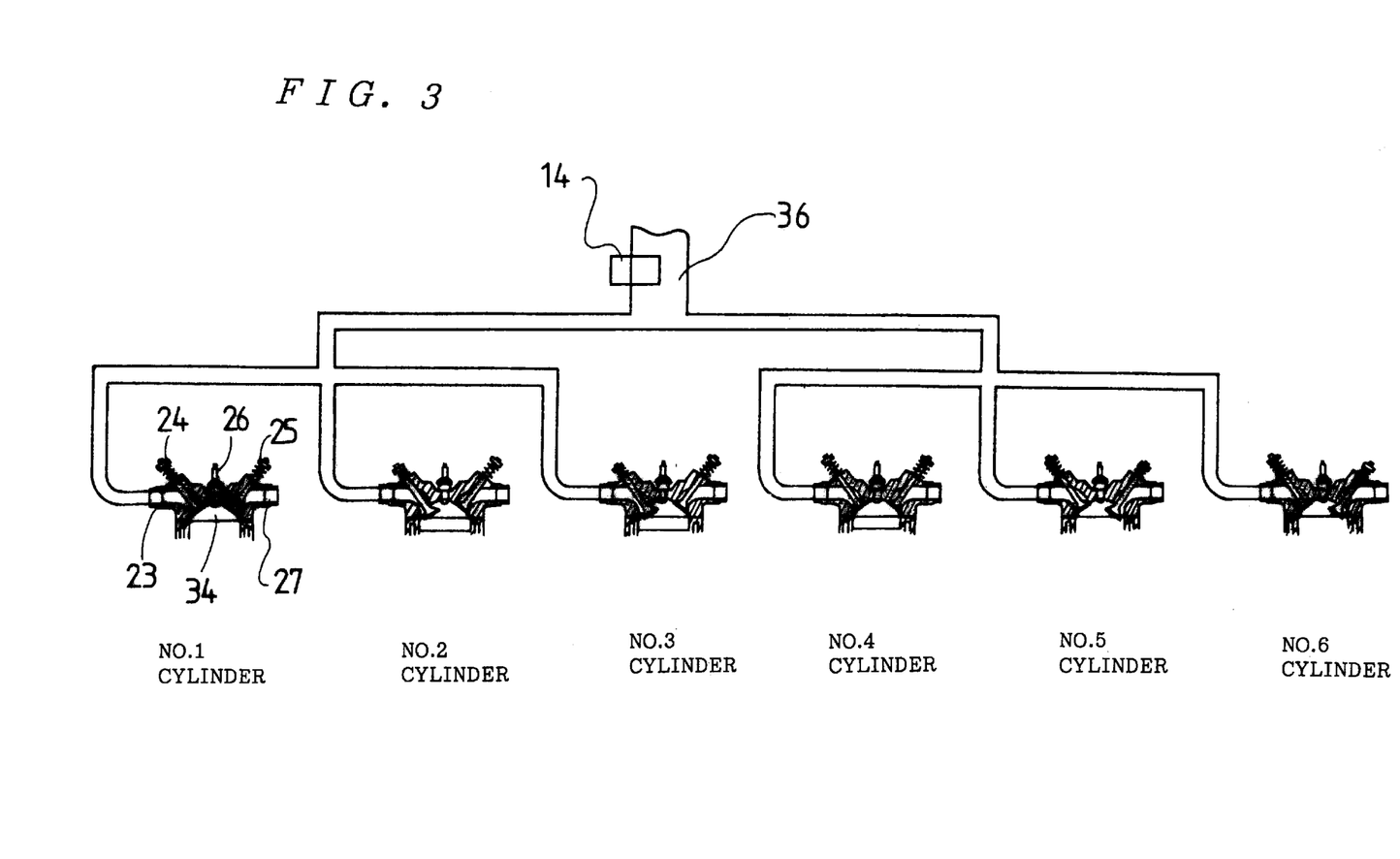
FIG. 3 is a schematic view of exhaust line of the gas engine

Next, main part of the gas engine 28 will be described according to FIG. 3. The gas engine 28 in the embodiment is a 4-cycle gas engine having six cylinders (No. 1 through No. 6 cylinders). Each cylinder exhausts one time the exhaust gas J produced by combustion every a crank shaft (not shown) rotates two times, and the gas engine 28 totally exhausts three times the exhaust gas J every the crank shaft rotates one time. In the gas engine 28, ignition order of each cylinder is predetermined according to the order of No. 6-No. 2-No. 4-No. 1-No. 5-No. 3.

A mixed gas pipe 27 for providing mixed gas of air and city gas is connected to each combustion chamber 34 of the cylinders. And a valve seat is formed at an area where the mixed gas pipe 27 is connected to the combustion chamber 34, and an inlet valve 25 which is used for shutting the mixed gas by contacting with the valve seat is arranged so as to be able to contact with and separate from the valve seat.

To the combustion chamber 34, an exhaust pipe 23 which is used for exhausting the exhaust gas J is connected. Similarly to the above, a valve seat is formed at an area where the exhaust pipe 23 is connected to the combustion chamber 34, and an exhaust valve 24 which is used for shutting the exhaust gas J by contacting with the valve seat is arranged so as to be able to contact with and separate from the valve seat.

The exhaust pipes 23 of six cylinders are collected into one through the collecting exhaust pipe 36 and are guided to the exhaust gas converter 30. At a position where six pipes 23 are collected into the collecting exhaust pipe 36, a pressure sensor 14 of the exhaust gas J for measuring the exhaust gas pressure is fixed, as shown in FIG. 3.

Figure 1:
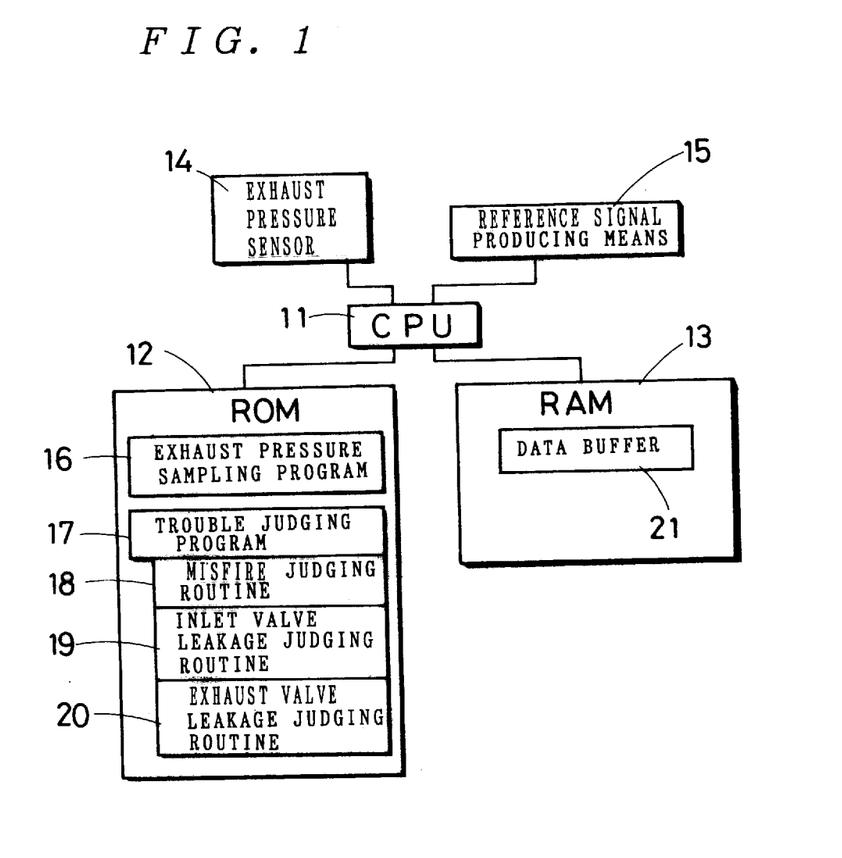
FIG. 1 is a block diagram indicating electric construction of the apparatus for detecting trouble states in the gas engine, according to the embodiment of the present invention.

The electric construction of the apparatus for detecting trouble states in the gas engine 28 will be described according to FIG. 1. CPU 11 acts as processing unit, and ROM 12 storing control programs and RAM 13 temporarily storing various data are connected to the CPU 11. In the ROM 12, exhaust pressure sampling program 16, trouble judging program 17, the other various control programs necessary for controlling the apparatus and various value data used in the trouble judging program 17 are stored. The trouble judging program 17 includes misfire judging routine 18 which judges misfire trouble and specifies the misfire cylinder, leakage judging routine 19 which judges the leakage of the fuel gas from the inlet valve 25 and specifies the inlet valve leakage cylinder, and leakage judging routine 20 which judges the leakage of the fuel gas from the exhaust valve 24 and specifies the exhaust valve leakage cylinder. The RAM 13 has data buffer 21 (memory) in which the value data sampled as mentioned below and the calculated data are stored. The pressure sensor 14 for measuring the pressure of the exhaust gas and reference signal producing means 15 are connected to the CPU 11.

Operation conducted in the above constructed apparatus for detecting trouble states in the gas engine 28 will be described hereinafter. In the 4-cycle engine, as mentioned above, the exhaust gas J produced by combustion is exhausted one time from each cylinder to the collecting exhaust pipe 36 every the crank shaft rotates two times.

In this case, when the exhaust gas pressure is measured by the pressure sensor 14 arranged to the collecting exhaust pipe 36, N pressure peaks are measured per two rotations in case of the engine having N cylinders. And if the engine is rotated with revolving speed R (rpm), the time interval during which the pressure peak is measured will be represented according to the following equation.

$$T(ms) = \frac{1000}{\frac{R \times N}{2 \times 60}} = 120000/(R \times N)$$

Here, in the above equation, N represents the number of the cylinders and R represents revolving speed R (rpm)

In case of the gas cogeneration system in the embodiment, since four polar dynamo 29 generates alternate electric power with 60 Hz, both the dynamo 29 and the gas engine 28 are driven with the revolving speed of R=1800 rpm and the number of the cylinders in the gas engine 28 is N=6.

Therefore, the time interval T in the embodiment is represented by the following equation.

That is, $$T(ms) = 120000 /(6 \times 1800) = 11.1$$

Figure 5:
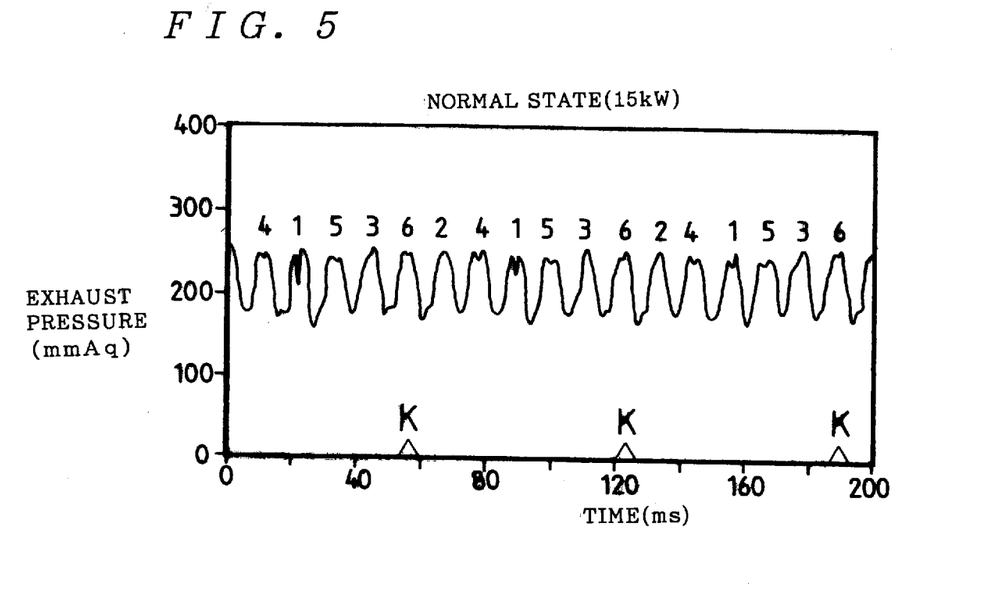
FIG. 5 is a graph indicating normal waveform of exhaust pressure.

In FIG. 5, it is understandable that the pressure peaks appear with the time interval of approximate 11 ms. In FIG. 5, ordinate represents the exhaust gas pressure (mm Aq) measured by the pressure sensor 14 fixed to the collecting exhaust pipe 36 of the gas engine 28, abscissa represents the time (ms). The graph indicated in FIG. 5 represents the normal waveform of exhaust pressure when none of troubles occurs.

As shown in FIG. 5, CPU 11 (shown in FIG. 1) outputs standard signals K based on the reference timing output from reference signal producing means 15 (shown in FIG.

1), the standard timing being output at a timing that a voltage is applied to a predetermined ignition plug. When the standard signals K are output, the pressure peak of the exhaust gas in the sixth (No. 6) cylinder is output as shown in FIG. 5. Following to such peak of the sixth cylinder, it is understandable that the pressure peak of the second (No. 2) cylinder, the pressure peak of the fourth (No. 4) cylinder, the pressure peak of the first (No. 1) cylinder, the pressure peak of the fifth (No. 5) cylinder and the pressure peak of the third (No. 3) cylinder are serially output according to the ignition order. Similarly to this tendency, the pressure peak of the sixth cylinder is output at the timing of the standard signal K.

Figure 2:
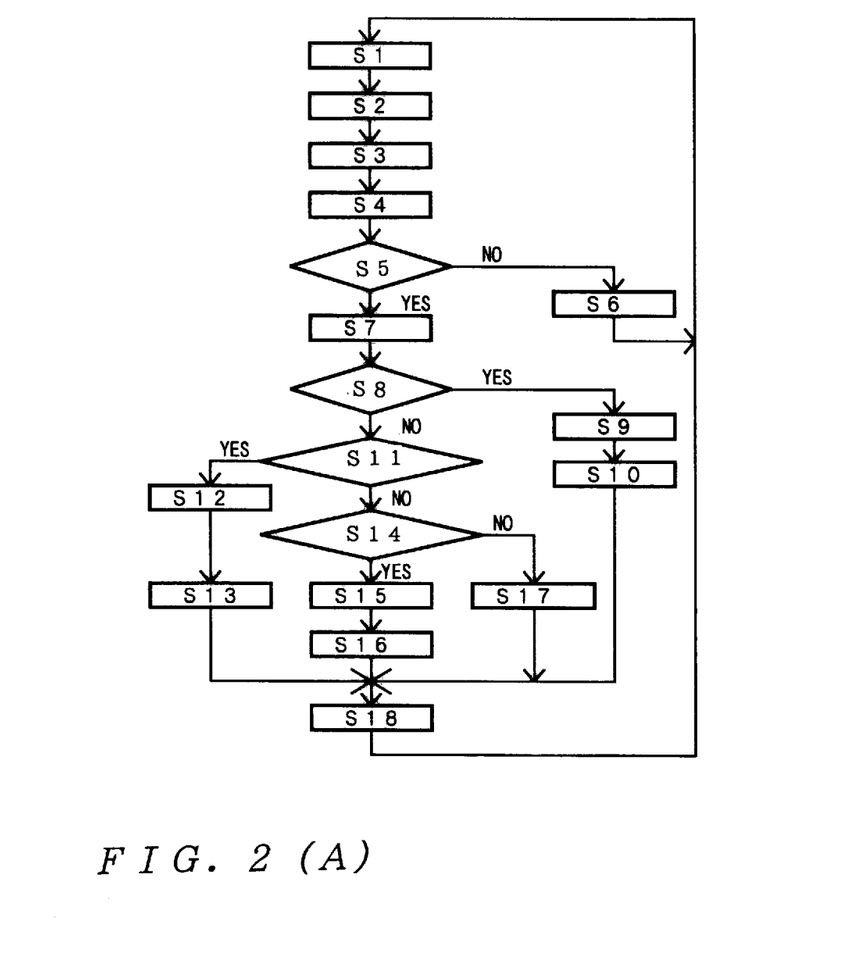
FIG. 2A is a flowchart indicating control procedure of the apparatus for detecting trouble states in the gas engine.
FIG. 2B is a procedure table corresponding to the flowchart in FIG. 2A.

Next, trouble judging procedure conducted in the apparatus will be described hereinafter according to the flowchart of FIG. 2A and procedure table FIG. 2B. In the gas cogeneration system, running status of the gas engine 28 is usually monitored by the apparatus while running of the gas engine 28. That is, in the apparatus, the values output from the pressure sensor 14 are sampled and predetermined calculation of such values is conducted based on the reference signal from the reference signal producing means 15. Further, it is judged whether trouble occurs in the gas engine 28 based on the calculated results and kind of trouble occurring in the gas engine 28 is judged.

The CPU 11 samples the the value data output from the pressure sensor 14 every for a predetermined time interval (ms) (which is set to 0.5 ms) from the standard signal K (S1). The thus sampled value data is stored in the data buffer 21. The CPU 11 calculates the average value $P_{AV}(i)$ of the exhaust pressure based on the sampled value data every the cylinder(S2). Here, (i)=1~6, and (i) is determined according to the ignition order of the cylinders. Therefore, (i)=4 in the first cylinder, (i)=2 in the second cylinder, (i)=6 in the third cylinder, (i)=3 in the fourth cylinder, (i)=5 in the fifth cylinder and (i)=1 in the sixth cylinder. The calculated average value $P_{AV}(i)$ is stored in the data buffer 21 of the RAM 13.

Further, the CPU 11 calculates standard deviation D of the average value $P_{AV}(i)$ (i=1~6) of each cylinder calculated in S2 (S3). The calculated standard deviation D is stored in the data buffer 21 of the RAM 13. And the CPU 11 calculates fluctuation value S (i=1~6) of the average value of exhaust pressure between the cylinders neighboring each other based on the average value $P_{AV}(i)$ (i=1~6) of each cylinder calculated in S2 (S4). Here, the fluctuation value S(i) is calculated according to the following equation.

$$S(i)=P_{AV}(i-1)-P_{AV}(i)$$

In the above equation, when (i)=1, (i-1)=6 in the previous cycle.

The calculated fluctuation value is stored in the data buffer 21 of the RAM 13. After the necessary data is calculated by conducting the above procedures S1 through S4, it is judged by the trouble judging program 17 whether the trouble presents or not and the kind of trouble if the trouble presents.

First, it is judged by the trouble judging program 17 whether the trouble of the gas engine 28 presents or not. In order to conduct this procedure, the standard deviation D calculated in S3 is compared with the standard deviation Ds which corresponds to a case that the gas engine 28 is preferably and normally operated (S5). The standard deviation Ds is approximately 2.5 mm Aq though it is affected by the kind of the gas engine 28. Such standard deviation Ds is in advance stored in the ROM 12 every the gas cogeneration system. Concretely, in S5, it is judged whether or not the standard deviation D obtained in S3 exceeds a value which is obtained by multiplying Ds by trouble judging threshold value N1. Here, though the trouble judging threshold value N1 changes according to the kind of the gas cogeneration system, the trouble judging threshold value N1 usually lies in a range of 2~3 and is stored in the ROM 12 every the gas cogeneration system.

In S5, if there is a relation "D≦Ds×N1 (S5:NO)" between D and Ds (S5:NO), it is judged that there is no trouble in the gas engine 28 (S6). The procedure returns to S1 for the next cycle.

In S5, if there is a relation "D>Ds×N1" between D and Ds (S5:YES), it is judged that there is a kind of trouble in the gas engine 28 (S7), thereafter the procedure shifts to S8 in order to judge the kind of trouble. In S8, to judge whether the trouble found in S7 is the misfire or not, the standard deviation D is compared again with the standard deviation Ds. Here, concretely, it is judged whether or not the standard deviation D obtained in S3 exceeds a value which is obtained by multiplying Ds by misfire judging threshold value N2. Because, in case that the trouble is the misfire, the standard deviation D becomes larger than the other case. Though the misfire judging threshold value N2 changes according to the kind of the gas engine 28, the misfire judging threshold value N2 is usually approximate 20 and is stored in the ROM 12 every the gas cogeneration system.

Figure 6:
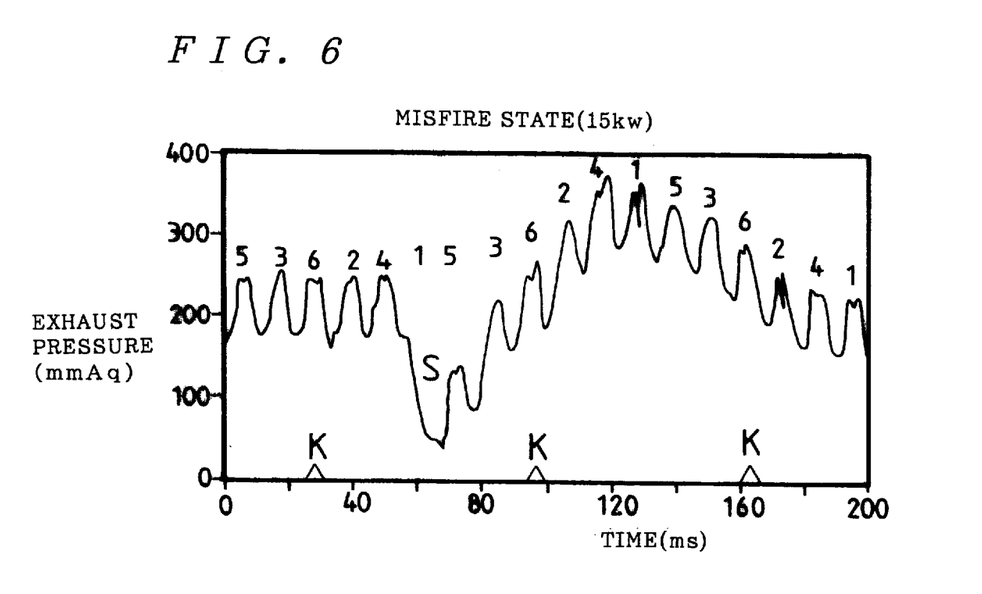
FIG. 6 is a graph indicating abnormal waveform of exhaust pressure when misfire occurs.
Figure 9:
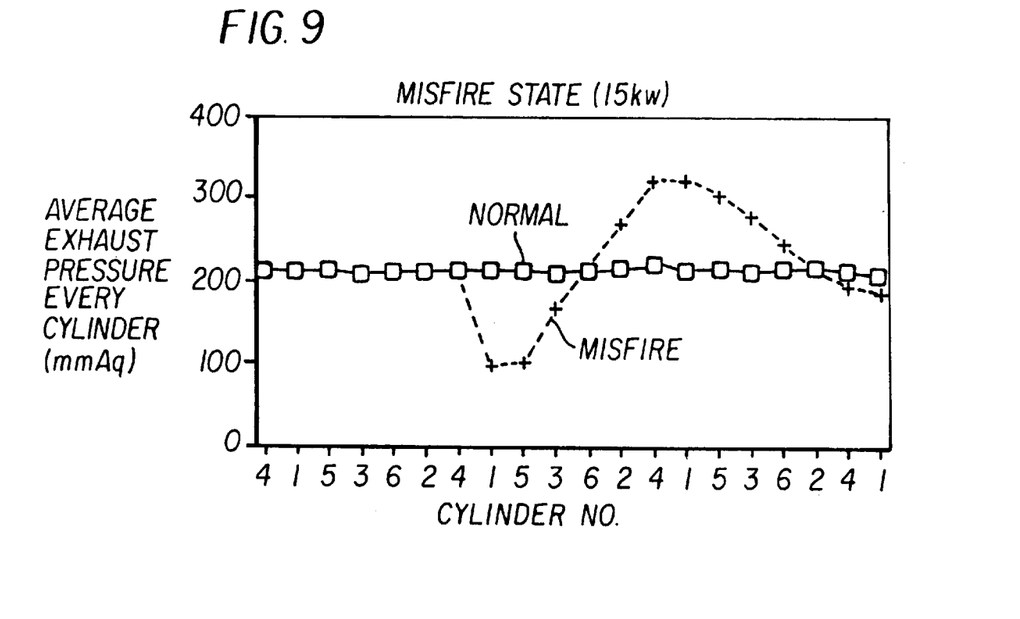
FIG. 9 is a graph indicating average exhaust pressure in each cylinder when the misfire occurs, in comparison with normal case.

If there is a relation "D>Ds×N2 (S8:YES)" between D and Ds, it is judged that there occurs the misfire in the gas engine 28 (S9). Here, the abnormal waveform of the exhaust pressure due to the misfire is shown in the graph of FIG. 6. It is understandable that the waveform is disordered due to the misfire. In FIG. 9, corresponding to the above disordered waveform, the average value $P_{AV}(i)$ calculated in S2 every the cylinder is shown in comparison with the average value $P_{AV}(i)$ in the normal state. Understandable from FIG. 9, the average value $P_{AV}(i)$ is largely changed from the average value $P_{AV}(i)$ in the normal state. In this state, when the standard deviation D is calculated, the standard deviation D becomes approximate 51.1, thus it is judged "YES" in S8.

Figure 10:
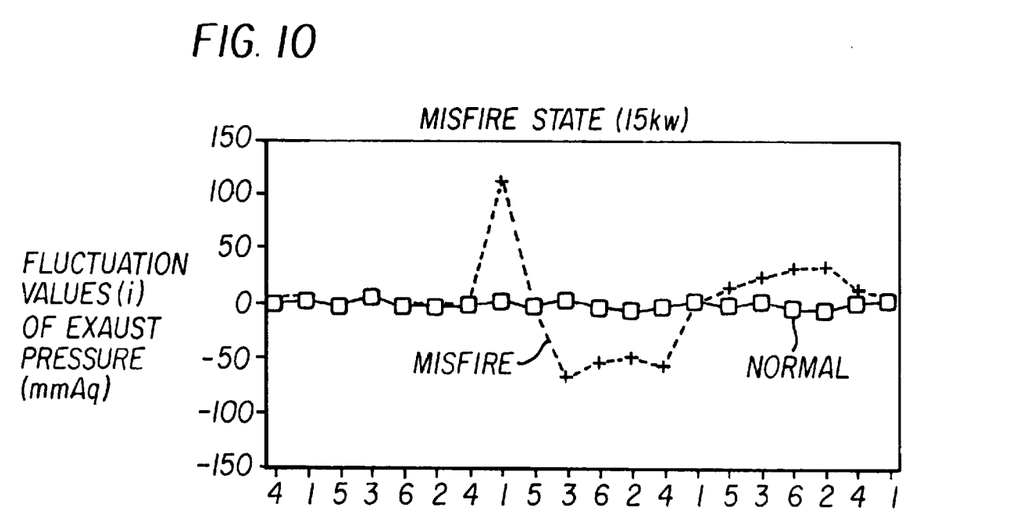
FIG. 10 is a graph indicating change of the average exhaust pressure in each cylinder when the misfire occurs, in comparison with normal case.

Thereafter, the cylinder with the misfire is specified as mentioned below. In order to specify such cylinder, the fluctuation value S(i) calculated in S4 for the cylinders neighboring each other is compared with that of each cylinder. Here, in FIG. 10, the fluctuation value S(i) in the cylinder with the misfire is shown in comparison with the fluctuation value S(i) in the cylinder with normal state. Understandable from FIG. 10, the fluctuation value S(i) is largely changed from the normal fluctuation value S(i). According to FIG. 10, the cylinder in which the maximum fluctuation value S(i) is measured, is specified as the cylinder with the misfire (S10). Because, when the misfire occurs in the cylinder, a large value of the fluctuation value S(i) occurs since the unburnt gas exhausted from such cylinder has only a low pressure, thus the pressure peak which inherently occurs is not generated. This is supported in the graph of FIG. 6. That is, in the graph of FIG. 6, the pressure peak is not generated in the first (No. 1) cylinder indicated by an arrow due to the misfire, instead that, large lowering S is generated therein without occurring the pressure peak.

Here, in the graphs of FIG. 6 and FIG. 9, after the misfire occurs, the exhaust pressure is wholly increased after a while. This is based on that though the output force of the gas engine 28 is decreased due to the misfire, the other cylinders are controlled so as to increase the output force thereof by increasing quantity of fuel provided thereto, in order to compensate the above decrease of the output force. After the cylinder with the misfire is specified, judging result is output (S18) and the procedure returns to S1 for the next cycle.

In case that there is a relation "D≦Ds×N2 (S8:NO)", it is judged that the trouble occurring in the gas engine 28 is not the misfire and is judged what kind of trouble except for the misfire occurs in the gas engine 28. First, in order to judge whether the trouble is the leakage from the inlet valve 25 based on the leakage judging routine 19, the fluctuation value S(i) calculated in S4 for the cylinders neighboring each other is compared with the standard deviation Ds which corresponds to a case that the gas engine 28 is preferably and normally operated (S11). Concretely, in S11, it is judged whether or not the fluctuation value S(i) is smaller than a value which is obtained by multiplying Ds by inlet valve leakage judging threshold value N3. This is based on that the maximum fluctuation value S(i) does not become so large in case of the inlet valve leakage among troubles occurring in the gas engine 28, in comparison with a case of exhaust valve leakage (mentioned hereinafter). Here, though the inlet valve leakage judging threshold value N3 changes according to the kind of the gas cogeneration system, the inlet valve leakage judging threshold value N3 usually lies in a range of 10~20 and is stored in the ROM 12 every the gas cogeneration system.

Figure 7:
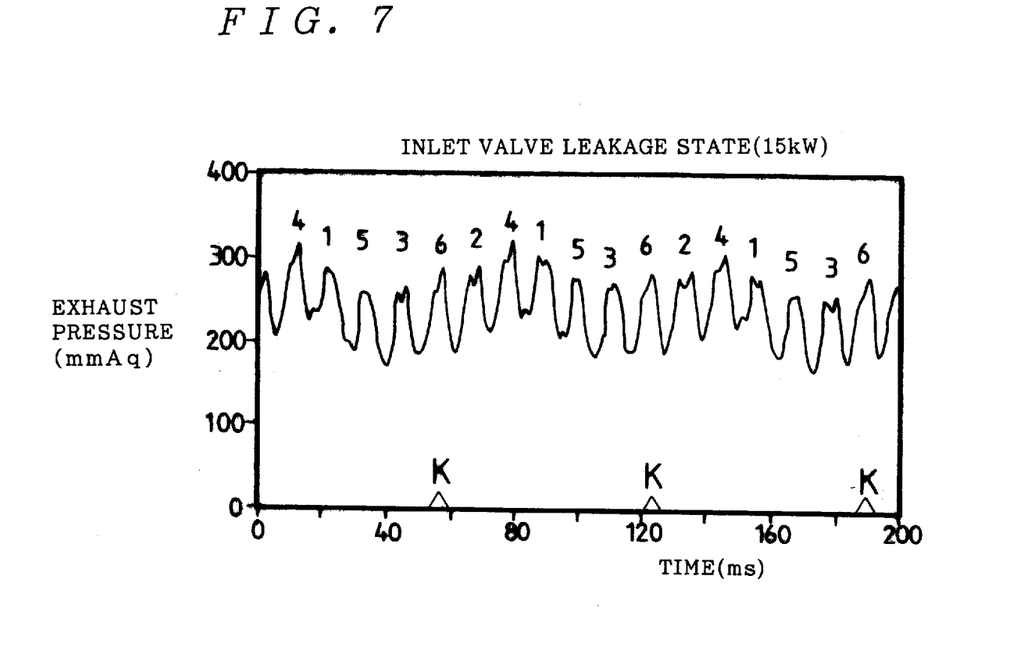
FIG. 7 is a graph indicating waveform when leakage of combustion gas occurs through inlet valve.
Figure 11:
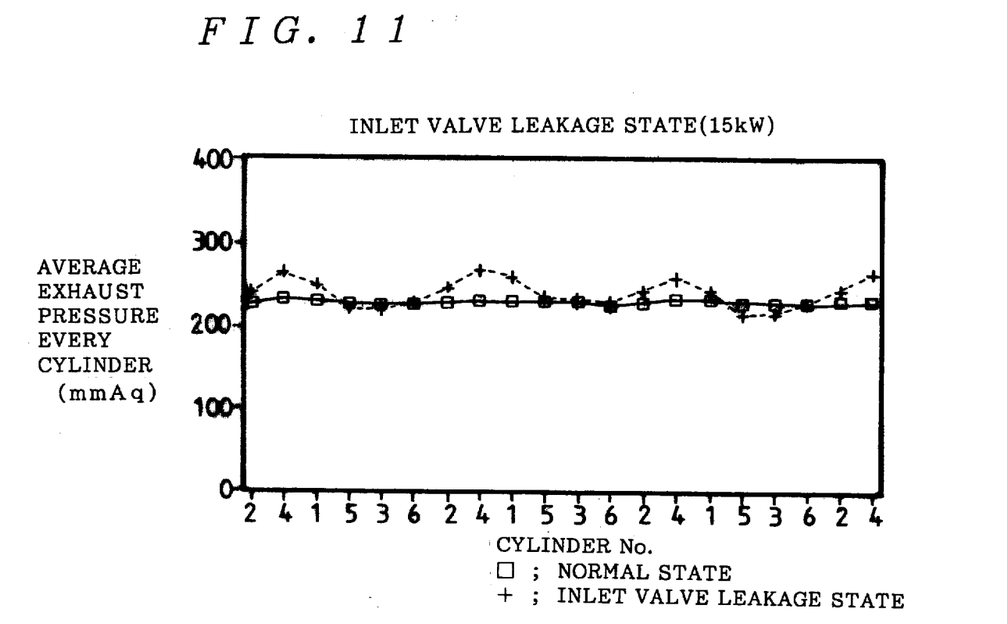
FIG. 11 is a graph indicating average exhaust pressure in each cylinder when the leakage of combustion gas occurs through the inlet valve, in comparison with normal case.
Figure 12:
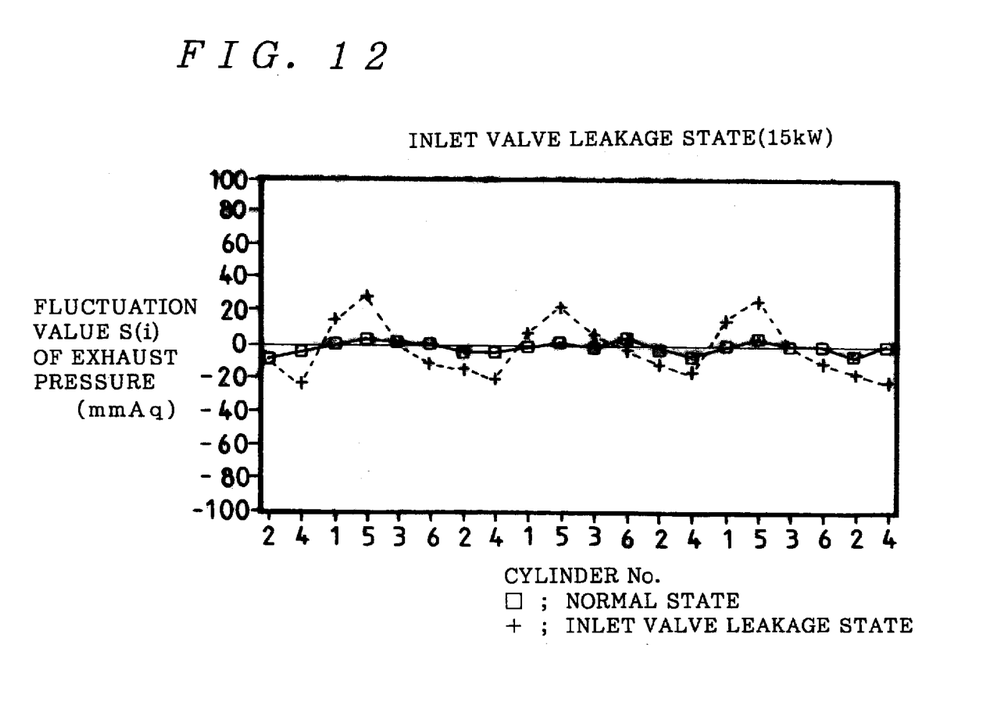
FIG. 12 is a graph indicating change of the average exhaust pressure in each cylinder when the leakage of combustion gas occurs through the inlet valve, in comparison with normal case.

If there is a relation "maximum S(i)<Ds×N3" (S11:YES), it is judged that the inlet valve leakage occurs in the gas engine 28 (S12). Here, in FIG. 7, the abnormal waveform of the exhaust pressure due to the inlet valve leakage is shown in the graph. It is understandable that the waveform is disordered due to the inlet valve leakage. In FIGS. 11 and 12, corresponding to the above disordered waveform, the average value $P_{AV}(i)$ calculated in S2 every the cylinder is shown in comparison with the fluctuation value S(i) of the average value $P_{AV}(i)$ calculated in S4 between the neighboring cylinders in the normal state. Understandable from FIGS. 11 and 12, both the average value $P_{AV}(i)$ and the fluctuation value S(i) are largely changed from both the average value $P_{AV}(i)$ and the fluctuation value S(i) in the normal state. In this state, when the standard deviation D is calculated, the standard deviation D becomes approximate 15.6, thus it is judged "NO" in S8, and the maximum value of the fluctuation value S(i) lies in a range of approximate 23~30 as read from FIG. 12, thus it is judged "YES" in S11.

Next, the cylinder in which the inlet valve leakage occurs is specified. Concretely, the average value $P_{AV}(i)$ of each cylinder is compared with each other, thereafter it is judged the cylinder which is ignited next to the cylinder having the maximum value among the average values $P_{AV}(i)$ (in FIG. 11, the first cylinder), as the cylinder in which the inlet valve leakage occurs (S13). This is based on the following reason. In case that the inlet valve leakage occurs, the combustion gas is leaked into the inlet pipe (mixed gas pipe 27) in the combustion stroke of the cylinder, and the combustion gas is inhaled into the cylinder in suction stroke, thereby the exhaust pressure of such cylinder is lowered. On the other hand, since the cylinder ignited just before the trouble cylinder is not affected by the above phenomena, thus the exhaust pressure thereof is raised. For instance, in the graph of FIG. 7, since the exhaust pressure of the fourth cylinder is raised, in the cylinder which is in combustion stroke when the fourth cylinder is in suction stroke, that is, in the first cylinder it can judge that the inlet valve leakage occurs.

Here, it is general that the inlet valve leakage inherently occurs in the same cylinder every cycle. For example, in FIGS. 7 and 11, the inlet valve leakage occurs in the first cylinder.

After the cylinder in which the inlet valve leakage occurs is specified, judging result is output (S18) and the procedure returns to S1 for the next cycle.

If there is a relation "maximum S(i)≧Ds×N3" (S11:NO), it is judged that the trouble of the gas engine 28 is not both the misfire and the inlet valve leakage, thus it is judged based on the exhaust valve leakage judging routine 20 whether or not the trouble is the exhaust valve leakage. In order to judge whether the trouble is the leakage from the exhaust valve 24, the fluctuation value S(i) calculated in S4 for the neighboring cylinders is compared with each other and further it is judged whether the maximum fluctuation value S(i) and the minimum fluctuation value S(i) (minus maximum value) are neighbored each other (S14). This is based on that the maximum value and the minimum value of the fluctuation value S(i) occur between the neighboring cylinders serially ignited, as mentioned hereinafter.

Figure 8:
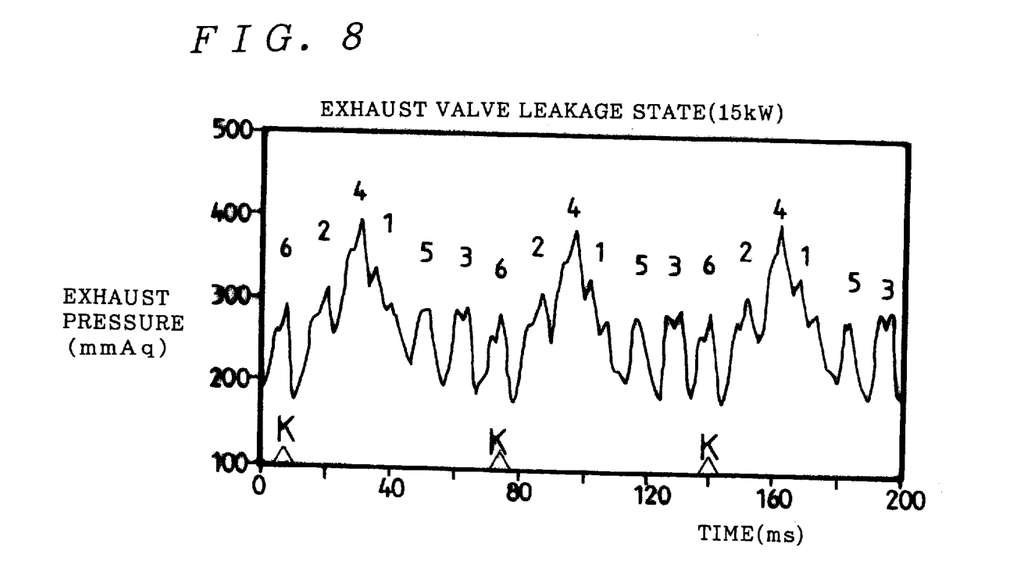
FIG. 8 is a graph indicating waveform when leakage of combustion gas occurs through exhaust valve.
Figure 13:
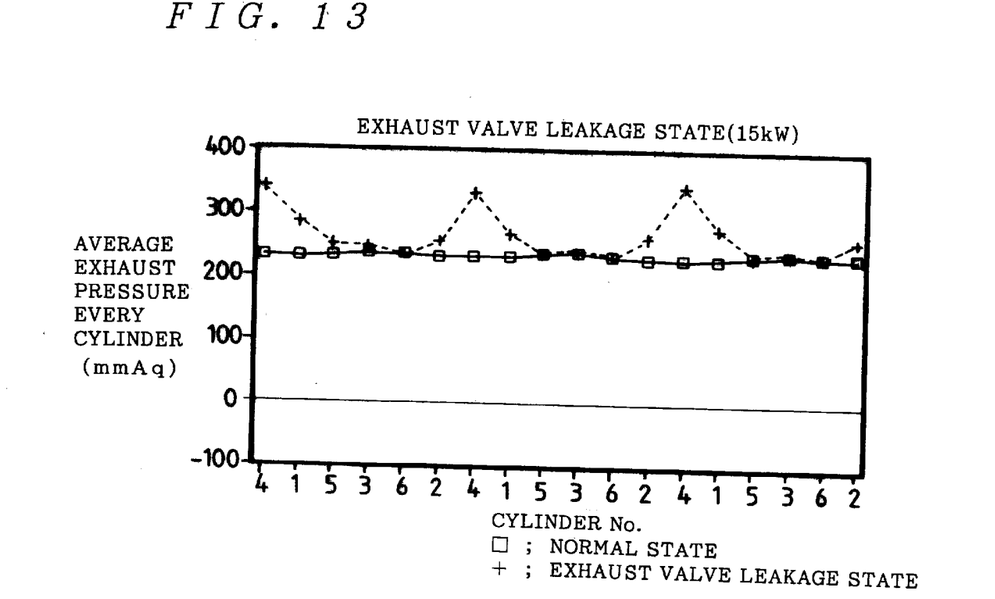
FIG. 13 is a graph indicating average exhaust pressure in each cylinder when the leakage of combustion gas occurs through the exhaust valve, in comparison with normal case.
Figure 14:
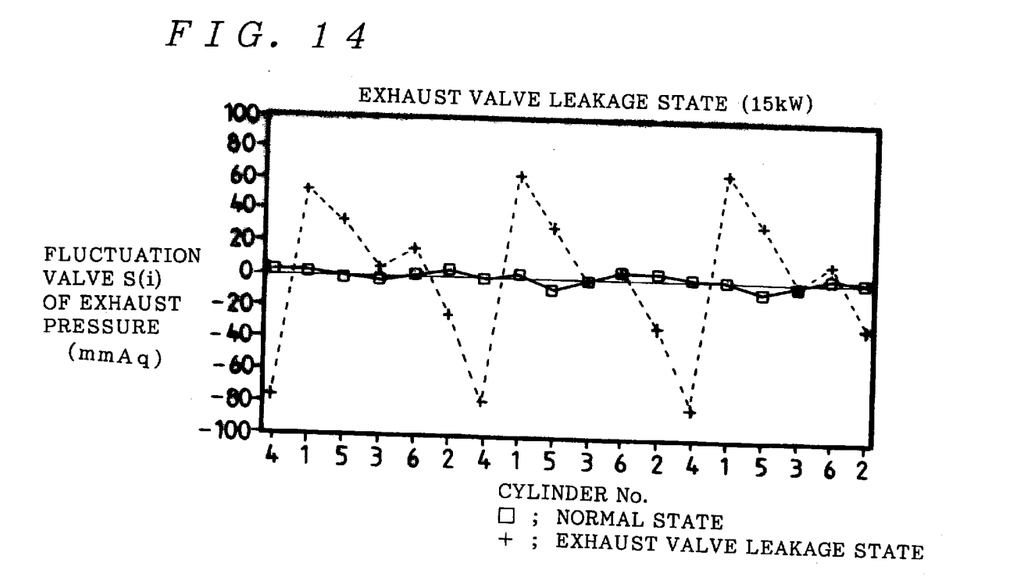
FIG. 14 is a graph indicating change of the average exhaust pressure in each cylinder when the leakage of combustion gas occurs through the exhaust valve, in comparison with normal case.

Therefore, if the maximum value and the minimum value of the fluctuation value S(i) are neighbored (S14:YES), it is judged that the exhaust valve leakage occurs in the gas engine 28 (S15). Here, when the exhaust valve leakage occurs, the exhaust pressure waveform is shown in the graph of FIG. 8. It is understandable from FIG. 8 that the exhaust pressure waveform is disordered due to the exhaust valve leakage. In FIGS. 13 and 14, corresponding to the above disordered waveform, the average value $P_{AV}(i)$ calculated in S2 every the cylinder is shown in comparison with the fluctuation value S(i) of the average value $P_{AV}(i)$ calculated in S4 between the neighboring cylinders in the normal state. Understandable from FIGS. 13 and 14, both the average value $P_{AV}(i)$ and the fluctuation value S(i) are largely changed from both the average value $P_{AV}(i)$ and the fluctuation value S(i) in the normal state. In this state, when the standard deviation D is calculated, the standard deviation D becomes approximate 35.7, thus it is judged "NO" in S8, and the maximum value of the fluctuation value S(i) lies in a range of approximate 50~70 as read from FIG. 14, thus it is judged "NO" in S11. Further, as shown in FIG. 14, it is judged that the maximum value and the minimum value of the fluctuation value S(i) are neighbored, thus it is judged "YES" in S14.

Next, the cylinder in which the exhaust valve leakage occurs is specified. Concretely, it is judged the cylinder which has the maximum fluctuation value S(i) (in FIG. 14, the first cylinder), as the cylinder in which the exhaust valve leakage occurs (S16). This is based on the following reason. In case that the exhaust valve leakage occurs, the combustion gas is leaked into the exhaust pipe 23 in the combustion stroke of the cylinder, and the exhaust pressure is raised in the cylinder in exhaust stroke at that time. On the other hand, raise of the exhaust pressure in exhaust stroke of the cylinder with the exhaust valve leakage is very small. For instance, in the graph of FIG. 14, the minimum fluctuation value S(i) appears in the fourth cylinder and further the maximum fluctuation value S(i) appears in the first cylinder. Therefore, it is judged that the exhaust valve leakage occurs in the first cylinder. Understandable from the graph in FIG. 8, in the cylinder which is in exhaust stroke when the first cylinder is in combustion stroke, that is, in the fourth cylinder the exhaust pressure is especially raised, contrarily in the first cylinder the exhaust pressure peak becomes very small.

Here, it is general that the exhaust valve leakage inherently occurs in the same cylinder every cycle. For example, in FIGS. 8 and 14, the exhaust valve leakage occurs in the first cylinder every cycle.

After the cylinder in which the exhaust valve leakage occurs is specified, judging result is output (S18) and the procedure returns to S1 for the next cycle.

In S14, if it is judged that the maximum value and the minimum value of the fluctuation value S(i) are not neighbored (S14:NO), it is concluded that the trouble occurring in the gas engine 28 does not correspond to all of the misfire, the inlet valve leakage and the exhaust valve leakage (S17). Thereafter, judging result is output (S18) and the procedure returns to S1 for the next cycle.

As described above, in case that the abnormal state occurs in the gas engine 28, both the kind of trouble and the cylinder No. in which the trouble occurs are output. Therefore, based on the output result, the exchanging parts such as the ignition plugs 26 necessary to repair the gas engine 28 and the suitable maintenance work (for example, whether attachment and detachment of the cylinder heads are necessary or not) can be easily acknowledged beforehand. As a result, maintenance work necessary and sufficient to maintenance the gas engine 28 can be quickly done according to the above.

As mentioned in detail, in the apparatus for detecting trouble states in the gas engine 28 according to the embodiment, the exhaust gas pressure after combustion in each cylinder is measured by the pressure sensor 14 installed on the collecting exhaust pipe 36 and the average value $P_{AV}(i)$ of the exhaust pressure, the standard deviation D and the fluctuation value S(i) of the average value $P_{AV}(i)$ in each cylinder are calculated based on the above waveform. Further, based on the calculated data, it is specified whether the trouble occurring in the gas engine 28 corresponds to the misfire, the inlet valve leakage or the exhaust valve leakage and what cylinder the trouble occurs in. Therefore, the kind of trouble can be correctly specified in early stage of the trouble. As a result, maintenance work such as exchange of parts necessary and sufficient to maintenance the gas engine 28 can be rapidly conducted before the trouble is progressed. Thus, the gas engine 28 can be retained in good condition without excessive parts exchange and maintenance work, and further not only it can be avoided after-fire, back-fire and mechanical damage of the gas engine 28, but also life of the catalyser for purifying the exhaust gas can be lengthened.

While the invention has been particularly shown and described with reference to preferred embodiments thereof, it will be understood by those skilled in the art that the foregoing and other changes in form and details can be made therein without departing from the spirit and scope of the invention.

For instance, though one pressure sensor 14 is arranged on the collecting exhaust pipe 36 to which six exhaust pipes 23 are collected into one in the above mentioned embodiment, it is conceivable that a plurality of the cylinders are distributed in some groups and the pressure sensor 14 is arranged to each group. For example, this grouping method is suitable for an engine which has more than eight cylinders.

Further, though the embodiment is embodied in the 4-cycle gas engine, the apparatus according to the embodiment can be utilized in other type of engine. For example, the apparatus can be utilized for a 4-cycle gasoline engine since there are occurable troubles of the misfire, the inlet valve leakage and the exhaust valve leakage in such gasoline engine.

In case of diesel engine, it adopts natural ignition method, thus the misfire does not occur due to abrasion of the ignition plugs. However, ignition failure possibly occurs according to abnormality of fuel providing state. And the inlet valve leakage and the exhaust valve leakage possibly occur similarly to the gas engine. Therefore, the apparatus of the embodiment can be applied to the diesel engine.

In case of 2-cycle engine, the inlet valve leakage and the exhaust valve leakage does not occur since such engine does not have both the inlet valve and the exhaust valve. However, the misfire possibly occurs in the 2-cycle engine. Thus, as concerns the misfire, the apparatus of the embodiment can be applied thereto.

What is claimed is:

1. An apparatus for detecting trouble states in an engine including a plurality of cylinders, the apparatus comprising:
    pressure sensing means for measuring exhaust pressure values exhausted from the engine;
    sampling means for sampling the exhaust pressure values measured by the pressure sensing means during a predetermined time interval;
    first calculation means for calculating a representative value of the exhaust pressure values of every cylinder based on the exhaust pressure values sampled by the sampling means;
    second calculation means for calculating a standard deviation of the representative values calculated by the first calculation means;
    third calculation means for calculating a fluctuation value between representative values obtained in the cylinders an ignition order thereof being neighbored;
    first judgement means for judging whether the trouble state occurs in the engine by comparing the standard deviation with a first value;
    second judgement means for judging whether the trouble state occurring in the engine is misfire by comparing the standard deviation with a second value when judged that the trouble state occurs in the engine by the first judgement means; and
    third judgement means for judging whether the trouble state occurring in the engine is inlet valve leakage or exhaust valve leakage by comparing a maximum fluctuation value with a third value when judged that the trouble state occurring in the engine is not the misfire.

2. The apparatus according to claim 1, wherein the representative value corresponds to an average value of the exhaust pressure.

3. The apparatus according to claim 2, wherein the standard deviation calculated by the second calculation means corresponds to the standard deviation of the representative values.

4. The apparatus according to claim 2, wherein the first value is determined based on the standard deviation of the exhaust pressure obtained in the engine without trouble and a trouble judging threshold value.

5. The apparatus according to claim 4, wherein the first value is determined by multiplying the standard deviation of the exhaust pressure obtained in the engine without trouble by the trouble judging threshold value.

6. The apparatus according to claim 5, wherein the first judgement means judges that the trouble occurs in the engine when the standard deviation is larger than the first value.

7. The apparatus according to claim 3, wherein the second value is determined based on the the standard deviation of the exhaust pressure obtained in the engine without trouble and a misfire judging threshold value.

8. The apparatus according to claim 7, wherein the second value is determined by multiplying the standard deviation of the exhaust pressure obtained in the engine without trouble by the misfire judging threshold value.

9. The apparatus according to claim 8, wherein the second judgement means judges that the trouble occurring in the engine is misfire when the standard deviation is larger than the second value.

10. The apparatus according to claim 9, wherein the second judgement means specifies that a cylinder having the maximum fluctuation value is a misfire cylinder based on the fluctuation values calculated by the third calculation means when it is judged that the trouble occurring in the engine is the misfire.

11. The apparatus according to claim 2, wherein the third value is determined based on the standard deviation of the exhaust pressure obtained in the engine without trouble and an inlet valve leakage judging threshold value.

12. The apparatus according to claim 11, wherein the third value is determined by multiplying the standard deviation of the exhaust pressure obtained in the engine without trouble by the inlet valve leakage judging threshold value.

13. The apparatus according to claim 12, wherein the third judgement means judges that the trouble occurring in the engine is inlet valve leakage when the maximum fluctuation value is smaller than the third value.

14. The apparatus according to claim 13, wherein the third judgement means specifies that a cylinder ignited continuously to the cylinder having a maximum average value of the exhaust pressure is an inlet valve leakage cylinder in which the inlet valve leakage occurs based on the average values calculated by the second calculation means when it is judged that the trouble occurring in the engine is the inlet valve leakage.

15. The apparatus according to claim 13, wherein the third judgement means judges the trouble state based on whether both the maximum fluctuation value and the minimum fluctuation value appear between the cylinders continuously ignited each other.

16. The apparatus according to claim 15, wherein the third judgement means judges that the trouble occurring in the engine is an an exhaust valve leakage when it is judged that both the maximum fluctuation value and the minimum fluctuation value appear between the cylinders continuously ignited each other.

17. The apparatus according to claim 16, wherein the judgement means specifies that a cylinder having a maximum fluctuation value is an exhaust valve leakage cylinder based on the fluctuation values calculated by the third calculation means when it is judged that the trouble occurring in the engine is the exhaust valve leakage.

18. An apparatus for detecting trouble states in a gas engine utilized in a gas cogeneration system, the gas engine including a plurality of cylinders, the apparatus comprising:

pressure sensing means for measuring exhaust pressure values exhausted from the gas engine;

sampling means for sampling the exhaust pressure values measured by the pressure sensing means during a predetermined time interval;

first calculation means for calculating an average value of the exhaust pressure values of every cylinder based on the exhaust pressure values sampled by the sampling means;

second calculation means for calculating a standard deviation of the average values calculated by the first calculation means;

third calculation means for calculating a fluctuation value between values of the standard deviation obtained in the cylinders, an ignition order thereof being neighbored;

first judgement means for judging whether the trouble state occurs in the engine by comparing the standard deviation with a first value;

second judgement means for judging whether the trouble state occurring in the engine is misfire by comparing the standard deviation with a second value when judged that the trouble state occurs in the engine by the first judgement means; and third judgement means for judging whether the trouble state occurring in the engine is inlet valve leakage or exhaust valve leakage by comparing a maximum fluctuation value with a third value when judged that the trouble state occurring in the engine is not the misfire.

* * * * *